United States Patent
Hsu

(10) Patent No.: US 11,221,721 B2
(45) Date of Patent: Jan. 11, 2022

(54) ELECTROMAGNETIC INDUCTION TYPE COORDINATE POSITIONING APPARATUS

(71) Applicant: Shenzhen Pu Ying Innovation Technology Corp., LTD., Shenzhen (CN)

(72) Inventor: Chung-Wen Hsu, Shenzhen (CN)

(73) Assignee: Shenzhen Pu Ying Innovation Technology Corp., LTD., Shenzhen (CN)

(*) Notice: Subject to any disclaimer, the term of this patent is extended or adjusted under 35 U.S.C. 154(b) by 0 days.

(21) Appl. No.: 17/111,092

(22) Filed: Dec. 3, 2020

(65) Prior Publication Data

US 2021/0278915 A1 Sep. 9, 2021

(30) Foreign Application Priority Data

Mar. 6, 2020 (CN) .......................... 202010151712.9

(51) Int. Cl.
*G06F 3/046* (2006.01)
*H01F 27/28* (2006.01)
*G06F 3/041* (2006.01)

(52) U.S. Cl.
CPC .......... *G06F 3/046* (2013.01); *G06F 3/04162* (2019.05); *H01F 27/28* (2013.01)

(58) Field of Classification Search
CPC .. G06F 3/046; G06F 3/04162; G06F 3/03545; G06F 3/0441; G06F 3/0442; H01F 27/00; H01F 27/28; H01F 17/00; H01F 5/003; H01L 28/10
See application file for complete search history.

(56) References Cited

U.S. PATENT DOCUMENTS

2017/0153748 A1* 6/2017 Choi .................... G06F 3/0446

FOREIGN PATENT DOCUMENTS

| CN | 101957706 A | 1/2011 |
|---|---|---|
| CN | 103793122 A | 5/2014 |
| TW | 253003 B | 4/2006 |
| TW | 201137718 A | 11/2011 |
| TW | I420345 B | 12/2013 |
| TW | I420377 B | 12/2013 |
| TW | I486824 B | 6/2015 |
| TW | 201535189 A | 9/2015 |

* cited by examiner

*Primary Examiner* — Lisa S Landis
(74) *Attorney, Agent, or Firm* — Rabin & Berdo, P.C.

(57) ABSTRACT

An electromagnetic induction type coordinate positioning apparatus includes a first induction coil, a second induction coil, a first impedance circuit, a second impedance circuit, and a control circuit. The first induction coil and the first impedance circuit form a first excited current signal and the second induction coil and the second impedance circuit form a second excited current signal. The control circuit controls a first impedance value of the first induction coil to conform to a first predefined value and controls a second impedance value of the second induction coil to conform to a second predefined value, so that a first excited current signal reaching a first predefined level is formed on a current path between the first impedance circuit and the first induction coil, and a second excited current signal reaching a second predefined level is formed on a current path between the second impedance circuit and the second induction coil.

8 Claims, 4 Drawing Sheets

ELECTROMAGNETIC INDUCTION TYPE COORDINATE POSITIONING APPARATUS

CROSS-REFERENCE TO RELATED APPLICATION

This non-provisional application claims priority under 35 U.S.C. § 119(a) to Patent Application No. 202010151712.9 filed in China, P.R.C. on Mar. 6, 2020, the entire contents of which are hereby incorporated by reference.

BACKGROUND

Technical Field

The present disclosure relates to a coordinate positioning apparatus, and more particularly to an electromagnetic induction type coordinate positioning apparatus.

Related Art

Along with the progressing of technologies, electromagnetic induction type coordinate positioning apparatuses have been widely applied to various electronic device products such as mobile phones, tablet computers, and digital tablets. The operation power of the passive type pointer devices is supplied from the electromagnetic induction type coordinate positioning apparatus, and the power storage efficiency of the pointer device is related to the power supplying element of the electromagnetic induction type coordinate positioning apparatus. If the electromagnetic induction type coordinate positioning apparatus only can provide magnetic field flux with a fixed intensity but cannot flexibly adjust the intensity of magnetic field flux output, the flexibility in operation and use of the electromagnetic induction type coordinate positioning apparatus is limited and the power storage efficiency of the pointer device is poor.

In addition, some elements in the electromagnetic induction type coordinate positioning apparatus also affect the intensity of an excited magnetic field generated by the electromagnetic induction type coordinate positioning apparatus. For example, the electromagnetic induction type coordinate positioning apparatus includes a metal element, which affects the excited magnetic field generated by the electromagnetic induction type coordinate positioning apparatus, leading to low power storage efficiency of the pointer device. Moreover, if an inappropriate accessory is used for the electromagnetic induction type coordinate positioning apparatus, the accessory also affects the excited magnetic field generated by the electromagnetic induction type coordinate positioning apparatus, leading to low power storage efficiency of the pointer device.

SUMMARY

The present disclosure provides an electromagnetic induction type coordinate positioning apparatus adapted for a pointer device. The electromagnetic induction type coordinate positioning apparatus includes a first induction coil, a second induction coil, a first impedance circuit, a second impedance circuit, and a control circuit. A first excited current signal formed by the first induction coil and the first impedance circuit and generates an excited magnetic field, so that the pointer device may be coupled to the excited magnetic field to generate a first power storage signal for operation of the pointer device. A second excited current signal formed by the second induction coil and the second impedance circuit and generates an excited magnetic field, so that the pointer device may be coupled to the excited magnetic field to generate a second power storage signal for operation of the pointer device. The first impedance circuit is operated at a first impedance value. The second impedance circuit is operated at a second impedance value. The control circuit is configured to control, according to a first predefined value corresponding to the first induction coil, the first impedance value to conform to the first predefined value and control, according to a second predefined value corresponding to the second induction coil, the second impedance value to conform to the second predefined value in an electric-to-magnetic power conversion mode of the electromagnetic induction type coordinate positioning apparatus, so that a first excited current signal is formed on a current path between the first impedance circuit and the first induction coil and a level of the first excited current signal reaches a first predefined level, and a second excited current signal is formed on a current path between the second impedance circuit and the second induction coil and a level of the second excited current signal reaches a second predefined level.

DETAILED DESCRIPTION

Figure 1:
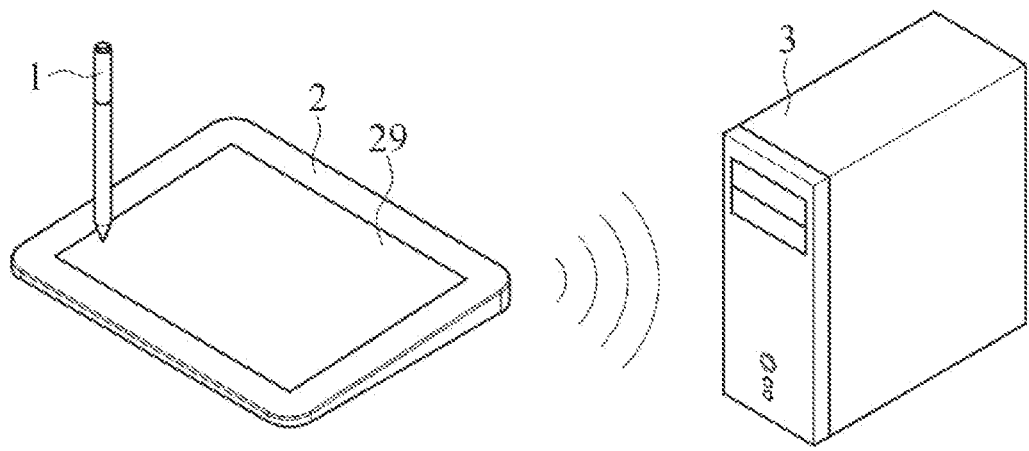
FIG. 1 is a schematic appearance diagram of an embodiment of an electromagnetic induction type coordinate positioning apparatus of the present invention and an embodiment of a pointer device 1 applicable to the electromagnetic induction type coordinate positioning apparatus.
Figure 2:
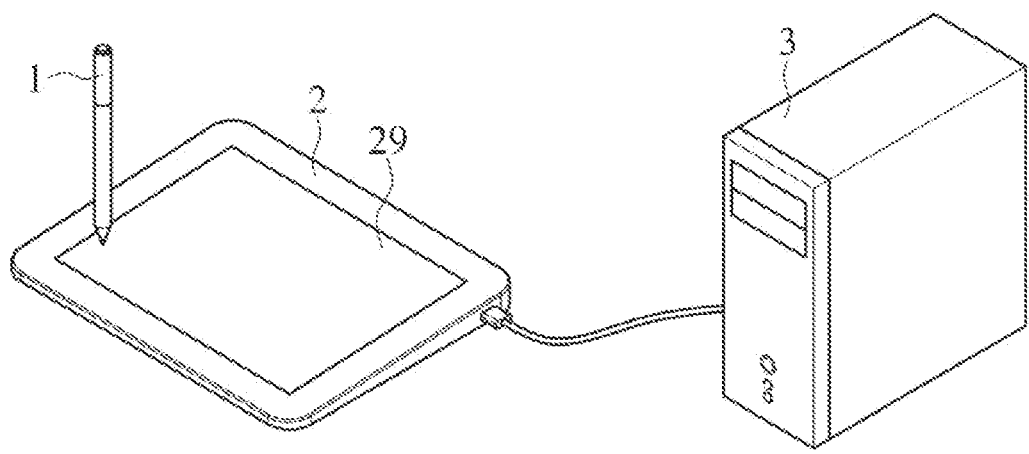
FIG. 2 is a schematic appearance diagram of another embodiment of an electromagnetic induction type coordinate positioning apparatus of the present invention and another embodiment of a pointer device applicable to the electromagnetic induction type coordinate positioning apparatus.

Referring to FIG. 1 and FIG. 2, the electromagnetic induction type coordinate positioning apparatus 2 may be a mobile phone, a tablet computer, a notebook computer, a digital tablet, or a smart notebook. The pointer device 1 may be an electromagnetic induction type stylus, mouse, or a puck. The electromagnetic induction type coordinate positioning apparatus 2 includes a working area 29. The pointer device 1 may or may not contact with the working area 29 of the electromagnetic induction type coordinate positioning apparatus 2. When the position of the pointer device 1 is close to the working area 29, the electromagnetic induction type coordinate positioning apparatus 2 may sense the position of the pointer device 1, and receive a signal sent by the pointer device 1. When the pointer device 1 is in contact with the electromagnetic induction type coordinate positioning apparatus 2, the electromagnetic induction type coordinate positioning apparatus 2 may further receive a pressure signal from the pointer device 1. In addition, as shown in FIG. 1 and FIG. 2, the electromagnetic induction type coordinate positioning apparatus 2 may communicate with another electronic device 3 in a wired or wireless manner. The electromagnetic induction type coordinate positioning apparatus 2 may generate an excited magnetic field by using an induction coil in which a current flows, and according to the principle of electromagnetic induction, enable the nearby pointer device 1 coupled to the excited magnetic field, so as to perform a power storage mechanism.

Figure 3:
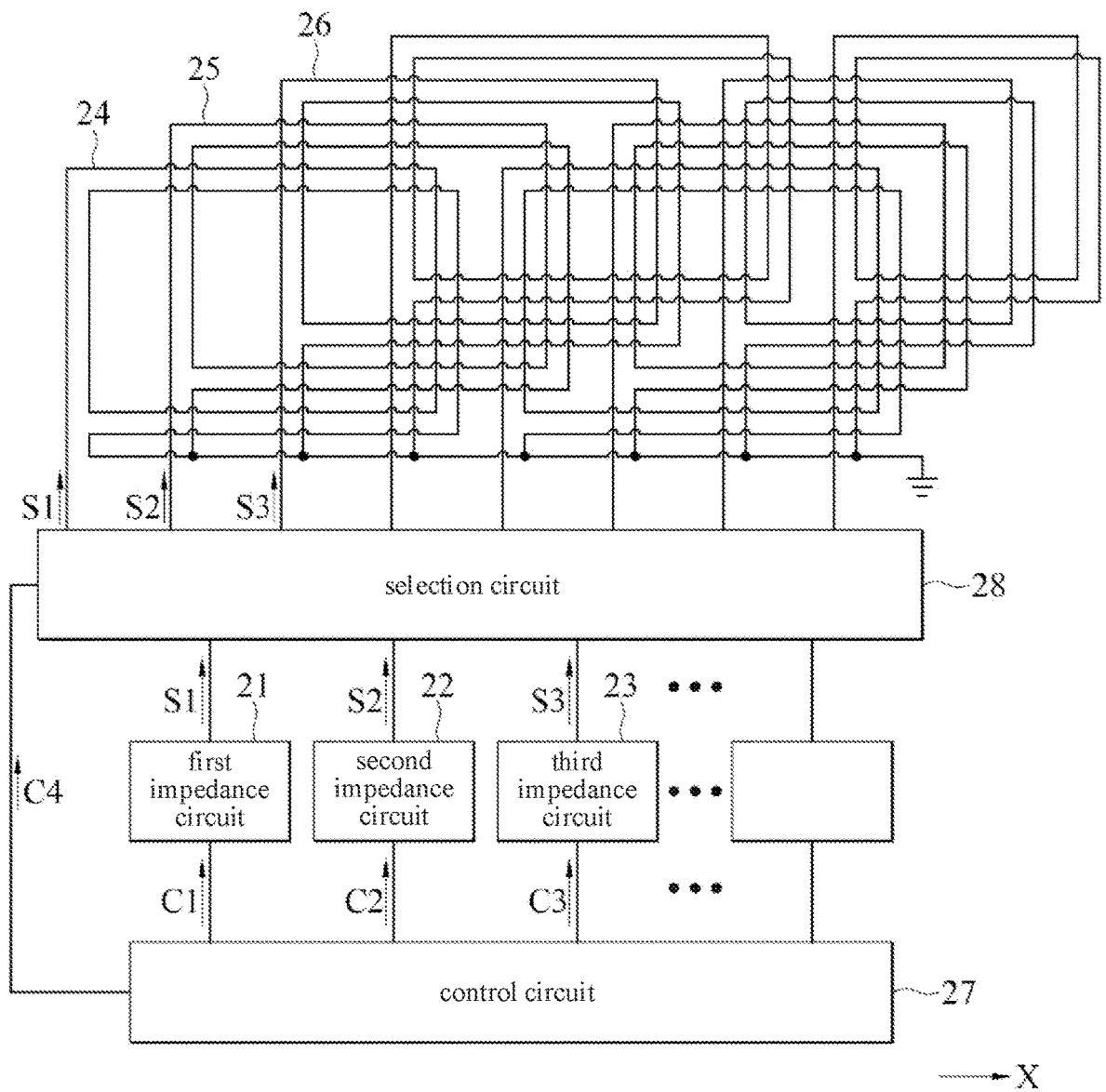
FIG. 3 is a schematic diagram of an embodiment of an electromagnetic induction type coordinate positioning apparatus of the present disclosure.

Referring to FIG. 3, FIG. 3 is a schematic diagram of an embodiment of an electromagnetic induction type coordinate positioning apparatus 2 of the present disclosure. The electromagnetic induction type coordinate positioning apparatus 2 includes a plurality of induction coils, a plurality of impedance circuits, and a control circuit 27. FIG. 3 shows an example where the number of induction coils is 8 and three induction coils 24-26 are shown. Moreover, for the brevity of description, the plurality of induction coils and the plurality of impedance circuits are described by using two induction coils 24 and 25 (hereinafter referred to as a first induction coil 24 and a second induction coil 25 for the convenience of description) and two impedance circuits 21 and 22 (hereinafter referred to as a first impedance circuit 21 and a second impedance circuit 22 for the convenience of description) as an example. The first induction coil 24 is coupled to the first impedance circuit 21, the second induction coil 25 is coupled to the second impedance circuit 22, and the first impedance circuit 21 and the second impedance circuit 22 are coupled to the control circuit 27. In other words, the first impedance circuit 21 is coupled between the first induction coil 24 and the control circuit 27, and the second impedance circuit 22 is coupled between the second induction coil 25 and the control circuit 27.

The first impedance circuit 21 has an adjustable first impedance value. The second impedance circuit 22 has an adjustable second impedance value. The first impedance circuit 21 and the second impedance circuit 22 may respectively select different impedance values from a plurality of impedance values to generate a first excited current signal S1 and a second excited current signal S2 having different current levels.

In particular, when the electromagnetic induction type coordinate positioning apparatus 2 is in an electric-to-magnetic power conversion mode, the control circuit 27 controls, according to a predefined impedance value corresponding to the first induction coil 24 (hereinafter referred to as a first predefined value), the first impedance value of the first impedance circuit 21, so that the first impedance value conforms to the first predefined value. Therefore, according to the first impedance value conforming to the first predefined value, a first excited current signal S1 is formed on a current path between the first impedance circuit 21 and the first induction coil 24 and the first excited current signal S1 meets an ideal predefined level (hereinafter referred to as a first predefined level), and the first excited current signal S1 flowing in the first induction coil 24 may meet the first predefined level, and generates an excited magnetic field having an ideal intensity according to the first excited current signal S1.

In addition, the control circuit 27 controls, according to a predefined impedance value corresponding to the second induction coil 25 (hereinafter referred to as a second predefined value), the second impedance value of the second impedance circuit 22, so that the second impedance value conforms to the second predefined value. Therefore, according to the second impedance value conforming to the second predefined value, a second excited current signal S2 is formed on a current path between the second impedance circuit 22 and the second induction coil 25 and the second excited current signal S2 also reaches another ideal predefined level (hereinafter referred to as a second predefined level), and the second excited current signal S2 flowing in the second induction coil 25 may meet the second predefined level, and generates an excited magnetic field having an ideal intensity according to the second excited current signal S2. When the user moves the pointer device 1 close to the induction coils 24 and 25, the pointer device 1 is inductively coupled to the excited magnetic field generated according to the first excited current signal S1 to generate a first power storage signal for operation of the pointer device 1, and the pointer device 1 is inductively coupled to the excited magnetic field generated according to the second excited current signal S2 to generate a second power storage signal for operation of the pointer device 1. The pointer device 1 respectively performs inductive coupling according to sequential actuation and scanning of the induction coils to meet the power storage requirement.

In some embodiments, the first predefined level and the second predefined level may be variable, and the first predefined level may be the same as or different from the second predefined level.

Based on this, the control circuit 27 may control the induction coils 24 and 25 according to different predefined impedance values to respectively generate excited current signals having different strengths, so as to generate excited magnetic fields having different intensities, thereby achieving flexible application to different conditions, and reducing the power consumption of the electromagnetic induction type coordinate positioning apparatus 2. For example, when the electromagnetic induction type coordinate positioning apparatus 2 determines that the pointer device 1 is closer to the first induction coil 24, the control circuit 27 may control the first impedance circuit 21 according to a small first predefined value to generate a first excited current signal S1 having a high predefined level, and control the second impedance circuit 22 according to a large second predefined value to generate a second excited current signal S2 having a low predefined level, so as to avoid the generation of two high currents, thereby reducing the power consumption of the electromagnetic induction type coordinate positioning apparatus 2.

In an embodiment, the third impedance circuit 23 is connected to the third induction coil 26 and the control circuit 27. The control circuit 27 controls, according to a third predefined value corresponding to the third induction coil 23, a third impedance value of the third impedance circuit 23 to conform to the third predefined value, so that a third excited current signal S3 is formed on a current path between the third impedance circuit 23 and the third induction coil 26 and a level of the third excited current signal S3 reaches a third predefined level. In an embodiment, the induction coils 24-26 each include a plurality of loops arranged along a same axial direction (for example, X axis or Y axis), and every two neighboring induction coils are arranged in a staggered manner. For example, two neighboring induction coils 24 and 25 are arranged in a staggered manner, two neighboring induction coils 25 and 26 are arranged in a staggered manner, the rest can be deduced by analogy, so the details will not be described herein. FIG. 3 shows an example in which the induction coils 24 to 26 each include two loops.

In some embodiments, the layout of the first induction coil 24, the second induction coil 25, and the third induction coil 26 in the electromagnetic induction type coordinate positioning apparatus 2 further needs to take into consideration the influence of an element affecting the excited magnetic field signals. The element affecting the excited magnetic field signals may be magnetic elements included in an accessory used outside the electromagnetic induction type coordinate positioning apparatus 2, for example, a magnet used on a leather case of the electromagnetic induction type coordinate positioning apparatus 2. When the magnetic field of a magnetic element such as a magnet approaches the electromagnetic induction type coordinate positioning apparatus 2, for example, when the magnetic element approaches the first induction coil 24, the excited magnetic field generated by the first induction coil 24 may increase or fade due to the influence of the magnetic element, and the first impedance circuit 21 selects a suitable impedance value to satisfy the first predefined value.

In particular, when the magnetic element causes fading of the excited magnetic field generated by the first induction coil 24, the first impedance circuit 21 selects a small impedance value, that is, the first impedance value is less than the second impedance value, so that the current level of the first excited current signal S1 is higher than the current level of the second excited current signal S2; when the magnetic element causes an increase in the excited magnetic field generated by the first induction coil 24, the first impedance circuit 21 selects a large impedance value, that is, the first impedance value is greater than the second impedance value, so that the current level of the first excited current signal S1 is lower than the current level of the second excited current signal S2. Based on this, after the control circuit 27 controls the first impedance value, the second impedance value, and the third impedance value of the third impedance circuit 23 to respectively conform to the first predefined value, the second predefined value, and the third predefined value, the excited magnetic fields generated by the induction coils 24-26 all reach ideal values, and the pointer device 1 can effectively store power and subsequently calculate coordinate values by means of magnetic induction.

In some embodiments, the electromagnetic induction type coordinate positioning apparatus 2 further includes a wireless communication module. To avoid interference, the circuit of the wireless communication module is shielded by metal. The shielding metal element is also an element affecting magnetic excited signals. For example, the first induction coil 24 in the induction coils 24, 25, and 26 is affected by the metal element, that is, the vertical distance between the first induction coil 24 and the metal element is less than a predefined distance, and the vertical distances between the induction coils 25 and 26 and the metal element are greater than the predefined distance. Therefore, the excited magnetic field generated by the first induction coil 24 may increase or fade due to the influence of the metal element, and the first impedance circuit 21 selects a suitable impedance value to satisfy the first predefined value.

In particular, when the metal element causes fading of the excited magnetic field generated by the first induction coil 24, the first impedance circuit 21 selects a small impedance value, that is, the first impedance value is less than the second impedance value, so that the current level of the first excited current signal S1 is higher than the current level of the second excited current signal S2; when the metal element causes an increase in the excited magnetic field generated by the first induction coil 24, the first impedance circuit 21 selects a large impedance value, that is, the first impedance value is greater than the second impedance value, so that the current level of the first excited current signal S1 is lower than the current level of the second excited current signal S2. After the control circuit 27 controls the first impedance value, the second impedance value, and the third impedance value to respectively conform to the first predefined value, the second predefined value, and the third predefined value, the excited magnetic fields generated by the induction coils 24-26 all reach ideal values, and the pointer device 1 can effectively store power and subsequently calculate coordinate values by means of magnetic induction.

In some embodiments, as shown in FIG. 3, the electromagnetic induction type coordinate positioning apparatus 2 further includes a selection circuit 28. The selection circuit 28 is coupled between the induction coils 24 and 25 and the impedance circuits 21 and 22. The selection circuit 28 is controlled by the control circuit 27. The selection circuit 28 selects, according to a control signal C4 generated by the control circuit 27, whether to electrically connect the first impedance circuit 21 to the first induction coil 24 and whether to electrically connect the second impedance circuit 22 to the second induction coil 25. When the impedance circuits 21 and 22 are electrically connected to the induction coils 24 and 25, the first excited current signal S1 generated by the first impedance circuit 21 flows through the first induction coil 24 and the second excited current signal S2 generated by the second impedance circuit 22 flows through the second induction coil 25. In some embodiments, the control circuit 27 may determine whether the induction coils 24 and 25 need to be electrically connected to the impedance circuits 21 and 22 to generate the excited current signals S1 and S2 and generate excited magnetic fields for power storage of the pointer device 1. When the determining result is yes, the electrical connection is established. When the determining result is no, the electrical connection is disrupted.

Figure 4:
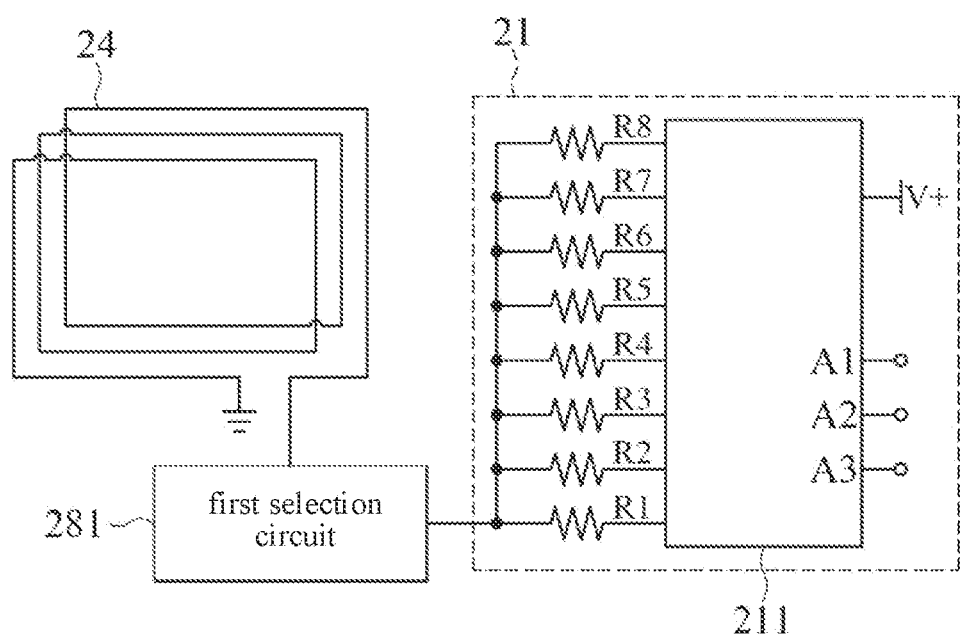
FIG. 4 is a circuit diagram of an embodiment of the electromagnetic induction type coordinate positioning apparatus of FIG. 3.

In some embodiments, referring to FIG. 3 and FIG. 4, FIG. 4 is a circuit diagram of an embodiment of the electromagnetic induction type coordinate positioning apparatus 2 of FIG. 3. The first impedance circuit 21, the second impedance circuit 22, and the third impedance circuit 23 each include a selector 211 and a plurality of resistors R1-R8, and respectively receive control signals C1, C2, and C3 generated by the control circuit 27. The circuit diagram shown in FIG. 4 shows an example where the first impedance circuit 21 is coupled to the first induction coil 24 and the number of resistors is 8. The first impedance circuit 21 includes a selector 211 and a plurality of resistors R1-R8. As shown in FIG. 4, the resistors R1-R8 are coupled between the first induction coil 24 and the selector 211.

The resistors R1-R8 have different impedance values, and the first impedance circuit 21 causes, according to different resistors R1-R8 selected, the first impedance value of the first impedance circuit 21 to conform to the first predefined value of the first induction coil 24. Control pins A1, A2, and A3 of the selector 211 receive the control signal C1 generated by the control circuit 27 and select, according to the control signal C1, to electrically connect to one of the resistors R1-R8. Therefore, a first excited current signal S1 is formed on a path extending through a positive voltage source V+ of the first impedance circuit 21, one of the resistors R1-R8 selected by the selector 211, and the first induction coil 24 (hereinafter referred to as a first predefined level), and a level of the first excited current signal S1 conforms to the first predefined level. For the selector 211 and the plurality of resistors R1-R8 in the second impedance circuit 22 and the third impedance circuit 23, reference may be made to the foregoing descriptions.

In some embodiments, as shown in FIG. 4, a first selection circuit 281 coupled between the first induction coil 24 and the first impedance circuit 21 is further included. The first selection circuit 281 is controlled by the control circuit 27. The control circuit 27 may control the first selection circuit 281 to select whether to electrically connect the first impedance circuit 21 to the first induction coil 24. For example, when the pointer device 1 approaches the first induction coil 24, the control circuit 27 may control the first selection circuit 281 to electrically connect to the first impedance circuit 21, the first excited current signal S1 generated by the first impedance circuit 21 flows through the first induction coil 24 and generates an excited magnetic field, and the pointer device 1 generates a current and stores power according to the principle of electromagnetic induction. For the selection circuit 28 coupled between the induction coils 25 and 26 and the impedance circuits 22 and 23, reference may be made to the foregoing descriptions.

Figure 5:
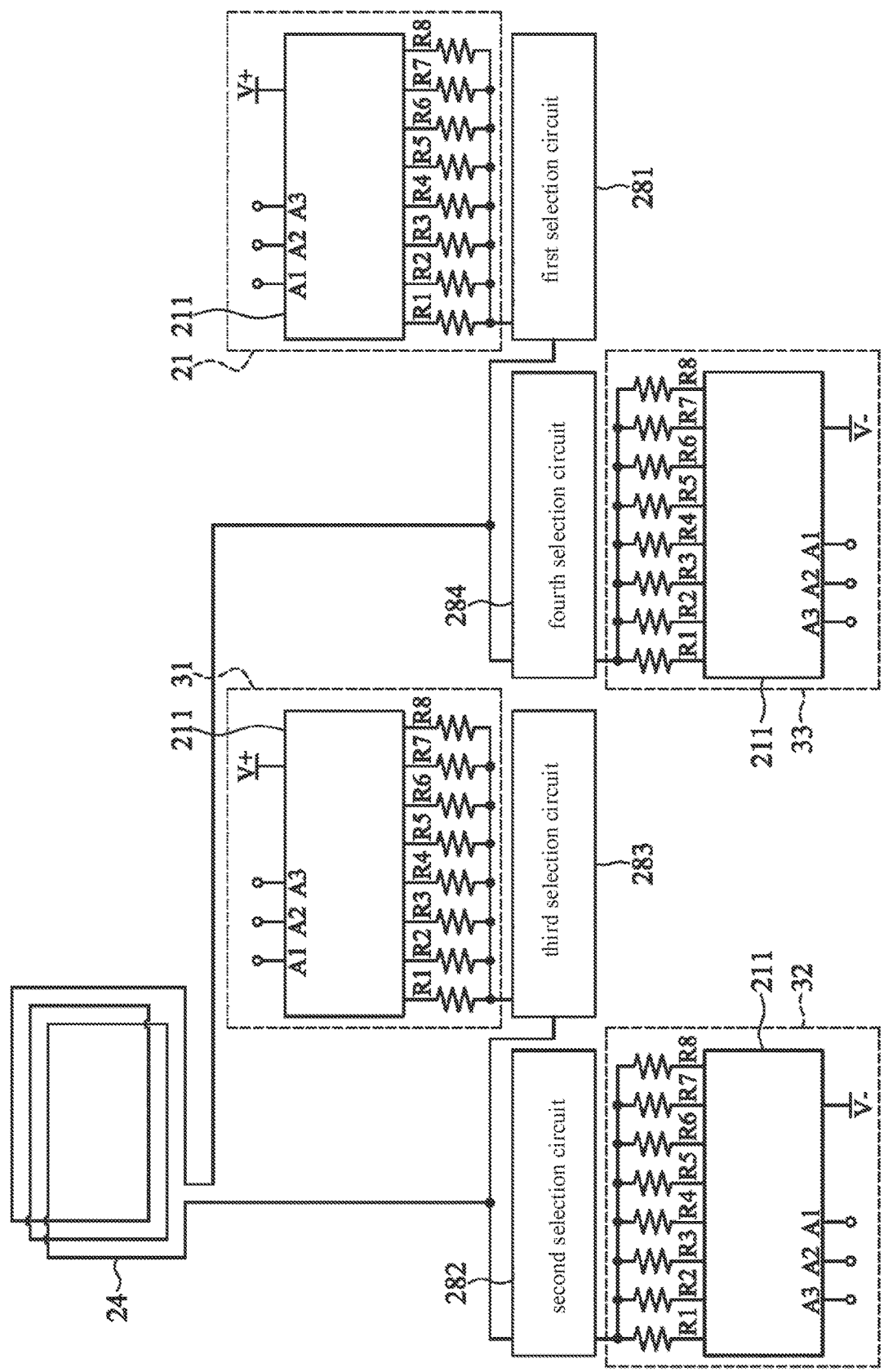
FIG. 5 is a circuit diagram of another embodiment of the electromagnetic induction type coordinate positioning apparatus of FIG. 3.

In some embodiments, referring to FIG. 5, FIG. 5 is a circuit diagram of another embodiment of the electromagnetic induction type coordinate positioning apparatus 2 of FIG. 3. The electromagnetic induction type coordinate positioning apparatus 2 further includes a fourth impedance circuit 31, a fifth impedance circuit 32, a sixth impedance circuit 33, and four selection circuits 281, 282, 283, and 284 (hereinafter referred to as a first selection circuit 281, a second selection circuit 282, a third selection circuit 283, and a fourth selection circuit 284). FIG. 5 uses the first induction coil 24 as an example, where the first selection circuit 281 is connected between a first end of the first induction coil 24 and the first impedance circuit 21, the second selection circuit 282 is connected between a second end of the first induction coil 24 and the fifth impedance circuit 32, the third selection circuit 283 is connected between the second end of the first induction coil 24 and the fourth impedance circuit 31, and the fourth selection circuit 284 is connected between the first end of the first induction coil 24 and the sixth impedance circuit 33.

When a frequency signal is at a certain phase (for example, a first phase), the control circuit 27 controls the first selection circuit 281 and the second selection circuit 282 to be on and controls the third selection circuit 283 and the fourth selection circuit 284 to be off, the first selection circuit 281 is electrically connected to the first end of the first induction coil 24 and the first impedance circuit 21, the first impedance circuit 21 is electrically connected to the positive voltage source V+, and the second selection circuit 282 is electrically connected to the second end of the first induction coil 24 and the fifth impedance circuit 32. The fifth impedance circuit 32 is electrically connected to a negative voltage source V− having a low level. Control pins A1, A2, and A3 of the selector 211 receive the control signal C1 generated by the control circuit 27 and select, according to the control signal C1, to electrically connect to one of the resistors R1-R8. Therefore, a first excited current signal S1 is formed on a path extending through the positive voltage source V+ of the first impedance circuit 21, one of the resistors R1-R8 selected, the first selection circuit 281, the first end of the first induction coil 24, the second end of the first induction coil 24, the second selection circuit 282, one of the resistors R1-R8 selected, and the negative voltage source V− (hereinafter referred to as a second path), that is, the first excited current signal S1 flows from the first selection circuit 281 to the first end of the first induction coil 24 and flows out from the second end of the first induction coil 24, and flows through the second selection circuit 282 and the fifth impedance circuit 32 to the negative voltage source V−, and according to impedance values of the first impedance circuit 21 and the fifth impedance circuit 32 on the second path, the level of the first excited current signal S1 conforms to the first predefined level.

In another case, when a frequency signal is at another phase (for example, a second phase), the control circuit 27 controls the first selection circuit 281 and the second selection circuit 282 to be off and controls the third selection circuit 283 and the fourth selection circuit 284 to be on, the third selection circuit 283 is electrically connected to the second end of the first induction coil 24 and the fourth impedance circuit 31, the fourth impedance circuit 31 is electrically connected to the positive voltage source V+, the fourth selection circuit 284 is electrically connected to the first end of the first induction coil 24 and the sixth impedance circuit 33, and the sixth impedance circuit 33 is electrically connected to the negative voltage source V−. Control pins A1, A2, and A3 of the selector 211 receive the control signal C1 generated by the control circuit 27 and select, according to the control signal C1, to electrically connect to one of the resistors R1-R8. Therefore, a first excited current signal S1 is formed on a path extending through a positive voltage source V+ of the fourth impedance circuit 31, one of the resistors R1-R8 selected, the third selection circuit 283, the second end of the first induction coil 24, the first end of the first induction coil 24, the fourth selection circuit 284, one of the resistors R1-R8 selected, and the negative voltage source V− (hereinafter referred to as a third path), that is, the first excited current signal S1 flows from the third selection circuit 283 to the second end of the first induction coil 24 and flows out from the first end of the first induction coil 24, and flows through the fourth selection circuit 284 and the sixth impedance circuit 33 to the negative voltage source V−, and according to impedance values of the fourth impedance circuit 31 and the sixth impedance circuit 33 on the third path, the level of the first excited current signal S1 conforms to the first predefined level. For the induction coils 25 and 26, reference may be made to the foregoing descriptions, and the details will not be described herein.

In some embodiments, the control signal C1 may be represented by three bits, and the control pins A1, A2, and A3 each correspond to one of the three bits. In other embodiments, the control signal C1 may have more than three bits including three bits corresponding to the control pins A1, A2, and A3. For the control signals C2 and C3, reference may be made the description of the control signal C1, and the details will not be described herein.

In some embodiments, The control circuit 27 may be a micro control unit (MCU), a central processing unit (CPU), an embedded controller (EC), or an application-specific integrated circuit (ASIC). The selection circuit 28 may be a multiplexer (MUX) or a switch.

Based on the above, according to an embodiment of the electromagnetic induction type coordinate positioning apparatus of the present disclosure, The electromagnetic induction type coordinate positioning apparatus can use the impedance circuits and the control circuit therein to correct levels of excited current signals transferred to the induction coils, according to the magnetic element close to the electromagnetic induction type coordinate positioning apparatus and the metal element for shielding the wireless communication module from interference, so as to solve the problem that the excited magnetic field is influenced by another magnetic field. In this way, the decrease in accuracy of the electromagnetic induction type coordinate positioning apparatus in detecting the position coordinates of the pointer device can be avoided, and the decrease in power storage performance due to fading of the excited magnetic field when the electromagnetic induction type coordinate positioning apparatus causes the pointer device to store power according to the principle of electromagnetic induction can also be avoided. The path through which the excited current signal flows is switched by means of electrical connection according to different frequency signal phases, thereby further improving the charging and power storage performance. The use of different impedance values to control the strengths of the excited current signals to generate different excited magnetic fields can achieve flexible application to different occasions, and reduce the power consumption of the electromagnetic induction type coordinate positioning apparatus.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electromagnetic induction type coordinate positioning apparatus, adapted for a pointer device, the electromagnetic induction type coordinate positioning apparatus comprising:
    a first induction coil, configured for a first excited current signal to flow through, so that the pointer device forms a first power storage signal for operation of the pointer device;
    a second induction coil, configured for a second excited current signal to flow through, so that the pointer device forms a second power storage signal for operation of the pointer device;
    a first impedance circuit, coupled to the first induction coil, and is operated at a first impedance value;
    a second impedance circuit, coupled to the second induction coil, and is operated at a second impedance value; and
    a control circuit, coupled to the first impedance circuit and the second impedance circuit, and configured to control, according to a first predefined value corresponding to the first induction coil, the first impedance value to conform to the first predefined value and control, according to a second predefined value corresponding to the second induction coil, the second impedance value to conform to the second predefined value in an electric-to-magnetic power conversion mode of the electromagnetic induction type coordinate positioning apparatus, so that a first excited current signal is formed on a current path between the first impedance circuit and the first induction coil and a level of the first excited current signal reaches a first predefined level, and a second excited current signal is formed on a current path between the second impedance circuit and the second induction coil and a level of the second excited current signal reaches a second predefined level.

2. The electromagnetic induction type coordinate positioning apparatus according to claim 1, further comprising a wireless communication module and a metal element configured to shield the wireless communication module from interference, wherein when the metal element causes an increase in an excited magnetic field generated by the first induction coil, the first predefined value is greater than the second predefined value, so that the first predefined level is lower than the second predefined level; and when the metal element causes fading of the excited magnetic field, the first predefined value is less than the second predefined value, so that the first predefined level is higher than the second predefined level.

3. The electromagnetic induction type coordinate positioning apparatus according to claim 1, wherein the electromagnetic induction type coordinate positioning apparatus is adapted for an accessory having a magnetic element; when the magnetic element causes an increase in an excited magnetic field generated by the first induction coil, the first predefined value is greater than the second predefined value, so that the first predefined level is lower than the second predefined level; and when the metal element causes fading of the excited magnetic field, the first predefined value is less than the second predefined value, so that the first predefined level is higher than the second predefined level.

4. The electromagnetic induction type coordinate positioning apparatus according to claim 1, wherein the first impedance circuit and the second impedance circuit each comprise a plurality of resistors and a selector, the plurality of resistors are coupled between the first induction coil and the selector, the plurality of resistors have different impedance values, the selector is controlled by the control circuit, and the first impedance value and the second impedance value each are one of the impedance values of the plurality of resistors.

5. The electromagnetic induction type coordinate positioning apparatus according to claim 1, further comprising:
    a first selection circuit, coupled between the first induction coil and the first impedance circuit, and configured to electrically connect the first induction coil to the first impedance circuit when a frequency signal is at a first phase;
    a second selection circuit, coupled to the first induction coil, and configured to electrically connect to the first induction coil when the frequency signal is at the first phase;
    a fourth impedance circuit, having a fourth impedance value;
    a third selection circuit, coupled between the first induction coil and the fourth impedance circuit, and configured to electrically connect the first induction coil to the fourth impedance circuit when the frequency signal is at a second phase; and
    a fourth selection circuit, coupled to the first induction coil, and configured to electrically connect to the first induction coil when the frequency signal is at the second phase, wherein the first excited current signal flows through the first impedance circuit, the first selection circuit, the first induction coil, and the second selection circuit to a low level when the frequency signal is at the first phase, and the first excited current signal flows through the fourth impedance circuit, the third selection circuit, the first induction coil, and the fourth selection circuit to another low level when the frequency signal is at the second phase.

6. The electromagnetic induction type coordinate positioning apparatus according to claim 5, wherein the first impedance circuit and the fourth impedance circuit each comprise a plurality of resistors and a selector, the plurality of resistors of the first impedance circuit are coupled between the first selection circuit and the selector of the first impedance circuit, the plurality of resistors of the fourth impedance circuit are coupled between the third selection circuit and the selector of the fourth impedance circuit, the plurality of resistors have different resistance values, and the first impedance value and the fourth impedance value each are one of the resistance values of the plurality of resistors.

7. The electromagnetic induction type coordinate positioning apparatus according to claim 5, further comprising a fifth impedance circuit and a sixth impedance circuit, wherein the fifth impedance circuit has a fifth impedance value and is coupled to the second selection circuit, the sixth impedance circuit has a sixth impedance value and is coupled to the fourth selection circuit, the first excited current signal flows through the first impedance circuit, the first selection circuit, the first induction coil, the second selection circuit, and the fifth impedance circuit to the low level when the frequency signal is at the first phase, and the second excited current signal flows through the fourth impedance circuit, the third selection circuit, the first induction coil, the fourth selection circuit, and the sixth impedance circuit to the another low level when the frequency signal is at the second phase.

8. The electromagnetic induction type coordinate positioning apparatus according to claim 5, wherein the first selection circuit and the fourth selection circuit are connected to a first end of the first induction coil; the second selection circuit and the third selection circuit are connected to a second end of the first induction coil; when the frequency signal is at the first phase, the first excited current signal flows from the first selection circuit to the first end of the first induction coil and flows from the second end of the first induction coil to the second selection circuit; and when the frequency signal is at the second phase, the first excited current signal flows from the third selection circuit to the second end of the first induction coil and flows from the first end of the first induction coil to the fourth selection circuit.

* * * * *